UNITED STATES PATENT OFFICE.

CLAUDE D. MASON, OF NAUGATUCK, CONNECTICUT, ASSIGNOR TO THE GOODYEAR'S METALLIC RUBBER SHOE CO., A CORPORATION OF CONNECTICUT.

METHOD OF MAKING VULCANIZED RUBBER.

1,183,022.  Specification of Letters Patent.  Patented May 16, 1916.

No Drawing.  Application filed June 18, 1915.  Serial No. 34,796.

*To all whom it may concern:*

Be it known that I, CLAUDE D. MASON, a citizen of the United States, and a resident of Naugatuck, county of New Haven, and State of Connecticut, have invented certain new and useful Improvements in Methods of Making Vulcanized Rubber, of which the following is a full, clear, and exact description.

This invention relates to a new and useful method of making vulcanized rubber, both in sheet form and in the form of articles of manufacture, and has for its principal object to provide vulcanized rubber in a new form and with new characteristics; also articles of manufacture made of rubber in which such features of novelty are embodied, these novel features better adapting such vulcanized rubber and articles of manufacture for their intended uses, as will be hereinafter more fully described.

The carrying out of my process results in the production of a vulcanized rubber article (which in its simplest form may be just a sheet of vulcanized rubber), having a new structural arrangement and provided with a surface of distinctive characteristics. While I know of no term that is entirely satisfactory to describe such structure and the surface formation with complete aptness, the characteristics of structure and surface formation may be most nearly described by the word rugose, by which is meant a structure comprising irregularly thick and thin portions and presenting a surface which has a wrinkled, puckered, or generally verrucous appearance. This new structural arrangement and surface presents the appearance of an irregular reticulation when stretched, the thick portions being bridged or connected by comparatively thin films or webs of rubber.

From the foregoing description it will be seen that the material produced by the practising of my method while tersely described as resulting in a rugose construction and surface appearance, it may be further characterized as being composed of an irregular network of vulcanized rubber elements held normally in a puckered, bunched or wrinkled condition by connecting films of vulcanized rubber integrally formed therewith.

In its preferred form the sheet is similar on both sides, the connecting films or webs of rubber being located substantially midway of the opposite surfaces. These films are relatively small in area in their contracted positions, and on casual observation are quite hidden by the wrinkled and larger formations surrounding and overhanging them.

To produce a material of the above characteristics crude rubber is washed and dried in any usual or preferred manner. To give the material the required structural characteristics it is then subjected to a partial breaking-down treatment. This may be accomplished by subjecting the stock to the action of milling rolls, which treatment is discontinued as soon as the stock assumes the desired appearance already described, that is to say, before the rubber breaks down completely or is worked into a complete homogeneous mass. The time consumed for this treatment will vary according to other conditions and therefore cannot be stated with any degree of definiteness.

The washing process which the rubber is usually subjected to may be taken advantage of for working the stock into this desired formation. During this treatment it may be made to assume the incomplete or partially homogeneous or broken-down condition and reduced to the desired sheeted form and then subjected to the drying process. The rubber being only partly broken-down also possesses superior properties on this account, for it is well known that the nerve or life of rubber is detrimentally affected in proportion to the amount of manipulation it undergoes.

To make the material suitable commercially for use in the manufacture of articles it is desirable in many instances that it have incorporated with it a coloring matter, as the original color of rubber would in many cases be entirely unsuitable. A coloring matter is best combined with the stock by first mixing it with a suitable loading material. Also to stiffen the stock or to improve it in other respects, or to cheapen its cost it is in some cases desirable to add other ingredients. Or where it is desired to vulcanize by the heat cure the required amount of sulfur may be incorporated into the rubber at this time. The incorporation of these ingredients and the coloring matter is accomplished after the stock has been washed and dried, and where ingredients are added the subsequent manipulation necessary to effect this incorporation requires great care to prevent the stock from entirely breaking down. That is to say, the subsequent manipulation must be comparatively brief to prevent an entire breaking down of the stock.

The incorporation of these ingredients is preferably obtained by milling the stock on the usual milling rolls, care being taken to maintain the rolls and stock in a substantially cool condition. The stock is also preferably prevented from passing around the rolls as this action has a greater breaking-down tendency, but is simply passed between the rolls, and this is repeated for no greater number of times than is necessary to effect the required incorporation, in some instances requiring no more than ten or twelve times. The stock is then sheeted to the desired gage after which it is built up into any shape, or if used in a sheeted form may be cut to the required patterns and built into the various articles of manufacture.

After it has thus received its final formation it is subjected to a vulcanizing treatment which is preferably the cold process to obviate the possibility of the stock becoming so soft under the action of the heat as to lose its characteristic before mentioned.

In the cold or sulfur monochlorid curing process the stock is apt to be overcured and thereby rendered useless if left in the solution for too great a length of time. Moreover where the stock contains much leading material it absorbs an unusually large amount of the curing solution and requires a greater length of time to effect the cure. If any solution is left in the stock it has a detrimental after effect resulting in materially shortening the life of the article. I therefore prefer to effect the curing of the material by dipping it for a very short space of time in a weak solution of the sulfur monochlorid.

A piece of my new vulcanized rubber has the property of stretching more at its thin portions than at its thicker projections and it is perhaps this that gives to the material so great an adhesion when attempt is made to draw it over another surface. By this construction the thin films or webs are protected from abrasive wear by the network of comparatively thick elements that surround them. The wear thus coming upon these comparatively thick elements, and the intervening relatively thin webs of rubber adding lightness to the material combined together give the material, in addition to the aforesaid anti-slipping property, a wearing property relatively great in comparison to its weight.

On account of the irregularity of the surface due to the various sizes of the crinkled formations the larger ones will be subjected to the initial wear and if these are worn down to present a smooth surface those smaller in size will still have the gritty anti-slipping surface which is desired, and this surface will continue until the sheeted material is practically worn out.

The material may be used in the manufacture of numerous articles. It is especially well adapted for articles of footwear such as rubbers where the anti-slipping property is important, also in bathing slippers for a similar reason and for the further reason that the rough inner surface of the slipper coming in contact with the foot serves to retain the slipper thereon, whereas in most articles of this kind additional measures are resorted to for holding the slipper on. The material forming the slipper being non-absorbent does not increase in weight which is an advantage over the usual bathing slipper made from textile fabric. On account of the properties already mentioned the material is also well adapted for use as massage wash cloths, bath mits, complexion cloths and the like. Also for use as handles for such articles as fishing rods, motor cycles and the like, where a sure, firm and non-slipping grip is required.

Having thus described my invention, what I claim and desire to protect by Letters Patent is:

1. The method of making vulcanized rubber which consists in passing crude rubber through rolls until it is partially broken down and thereby assumes sheet form with a rugose structural formation and appearance, and then vulcanizing the sheet in such condition.

2. The method of making vulcanized rubber which consists in passing crude rubber through rolls until it is partially broken down and thereby assumes sheet form with a rugose structural formation and appearance, giving the rubber the final formation of the article, and then vulcanizing the rubber in such condition.

Signed at Naugatuck, Conn., June 16, 1915.

CLAUDE D. MASON.